United States Patent [19]

Grönebaum

[11] 4,246,063

[45] Jan. 20, 1981

[54] MACHINE FOR ASSEMBLING VENEER STRIPS

[75] Inventor: Theo Grönebaum, Rietberg, Fed. Rep. of Germany

[73] Assignee: Firma Heinrich Kuper, Rietberg, Fed. Rep. of Germany

[21] Appl. No.: 906,622

[22] Filed: May 16, 1978

[30] Foreign Application Priority Data

May 17, 1977 [DE] Fed. Rep. of Germany ....... 2722224

[51] Int. Cl.[3] ............................................ B32B 31/04

[52] U.S. Cl. .................................. 156/558; 144/313; 156/304.1; 156/559; 156/575

[58] Field of Search ............... 156/266, 304, 512, 538, 156/539, 558, 559, 523, 524, 574, 575, 505, 507, 578; 144/309 P, 313

[56] References Cited

U.S. PATENT DOCUMENTS

| | | | |
|---|---|---|---|
| 2,488,759 | 11/1949 | Bolling | 156/558 |
| 2,640,796 | 6/1953 | Langer | 156/380 |
| 2,665,738 | 1/1954 | Caskin | 156/558 |
| 3,326,736 | 5/1967 | Ortel | 156/559 |
| 3,935,056 | 1/1976 | Koyama et al. | 156/304 X |
| 3,950,215 | 4/1976 | White | 156/558 |
| 4,042,440 | 8/1977 | Hasegawa et al. | 156/558 X |

FOREIGN PATENT DOCUMENTS

| | | | |
|---|---|---|---|
| 958334 | 12/1957 | Fed. Rep. of Germany | 156/558 |
| 1201533 | 4/1966 | Fed. Rep. of Germany | . |

*Primary Examiner*—Michael G. Wityshyn
*Attorney, Agent, or Firm*—Fleit & Jacobson

[57] ABSTRACT

Machine for assembling veneer strips comprising a reciprocating thread guide which is provided above a supporting table, a paper strip pasting device or the like which is arranged in front of a pressure roller rolling on the veneer strips along the connecting join thereof, comprising a device for conveying the veneer strips in opposite directions to a separating bar serving as a stop and extending vertically upwardly out of the table along the connecting join, and comprising a device for sealing the joins of the veneer strips by compression in which the thread guide and the pressure roller are arranged on a common carriage above the veneer strips, the carriage being displaceable parallel to the connecting join of the veneer strips, the separating bar being divided into individual separating elements which are arranged in a row at spaced intervals from each other and are lowerable in succession into the supporting table synchronously with the movement of the carriage.

20 Claims, 5 Drawing Figures

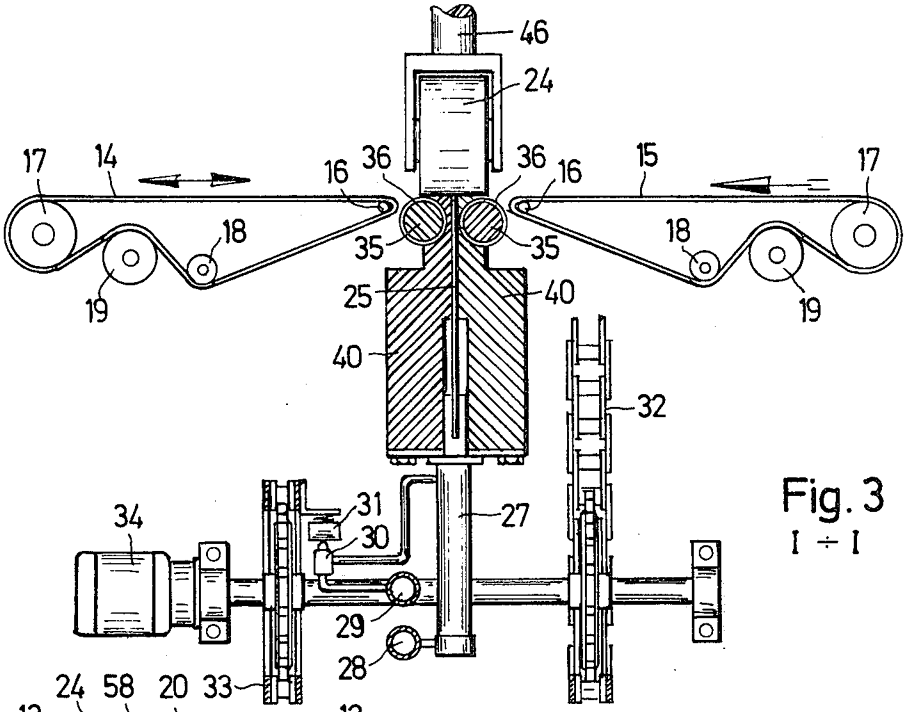
Fig. 3
I ÷ I
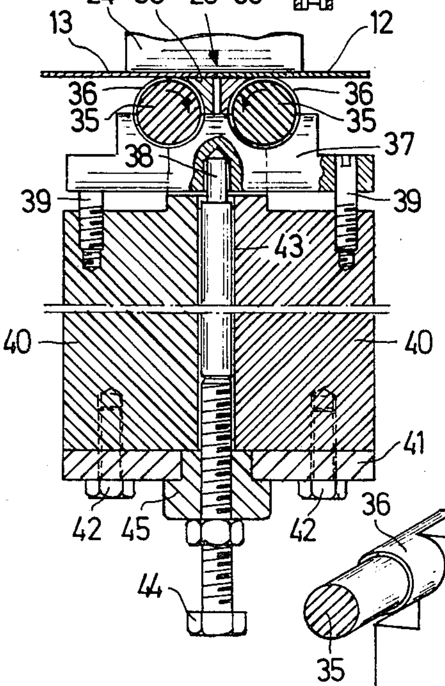
Fig. 4
II ÷ II
Fig. 5
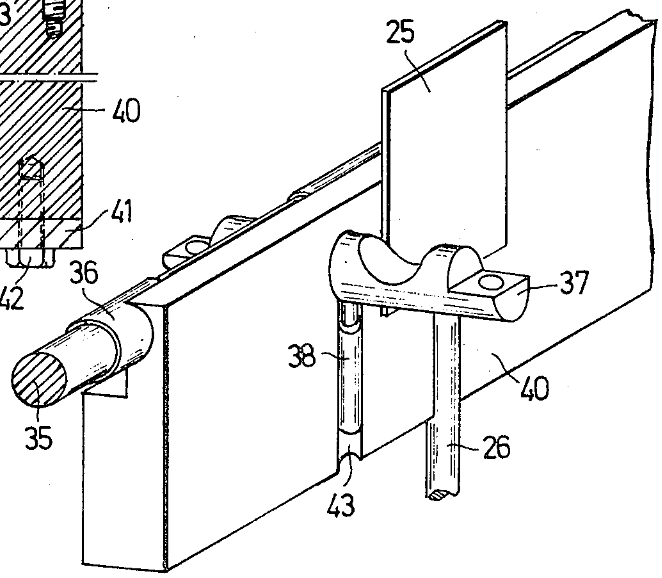

MACHINE FOR ASSEMBLING VENEER STRIPS

The present invention concerns a machine for assembling veneer strips or the like, and comprises a thread guide device arranged to reciprocate above a supporting table, a paper strip pasting device or the like which is arranged in front of a pressure roller rolling on the veneer strips along the connecting join thereof, comprising a device for transporting the veneer strip in opposite directions to a separating bar serving as a stop and extending vertically upwardly out of the supporting table along the connecting join, and comprising a device for sealing the joins of the veneer strips by compression.

From German Patent Specification No. 1201533 such a machine is known. Above the supporting table, the pressure roller is mounted on a rigid arm which is undisplaceable relative to the supporting table. Extending vertically out of the supporting table is a firm separating bar which is in alignment with the pressure roller. Near the pressure roller, plate-shaped discs are arranged which work in the supporting table as conveying means and are intended to press together the two veneer strips to be connected to each other, in the region of the pressure roller. The thread guide device contains an eccentric drive by which the thread feed tube is set into the reciprocating movement.

Such known machine has the disadvantage that the veneer strips must slide along the separating bar across the supporting table during the connecting process. They are disposed manually on the supporting table, pressed against the separating bar and pushed into the region of the pressure roller and the plate-shaped discs. This movement of the veneer strips taking place during the operation may restrict the desired tight assembling of the edges of the veneer strips near the thread guide device which is intended to apply the adhesive threads in a meandering form to the veneer strips near their connecting joins, and into the area of the pressure roller which is intended to press the adhesive threads on to both the veneer strips. Due to the participation of the movement applied by the operator in the working process, tight assembling of the edges of the veneer strips cannot always be guaranteed with such known machine. It is also a disadvantage with the known machine that the length of the veneer strips to be connected together is limited perpendicularly to the direction of their fibres which can be glued with the known machine. Each glueing operation for a new connecting join requires a backward movement of all the veneer strips already connected together. This backward movement becomes more difficult with each freshly applied veneer strip. The object of the present invention is to provide a machine of the above mentioned type by which any number of veneer strips with connecting joins of high quality can be rapidly and reliably manufactured without any essential participation by the operator in the working process.

In accordance with the present invention there is provided a machine for assembling veneer strips, said machine comprising a reciprocating thread guide which is provided above a supporting table, a paper strip pasting device or the like which is arranged in front of a pressure roller rolling on the veneer strips along the connecting join thereof, comprising a device for conveying the veneer strips in opposite directions to a separating bar serving as a stop and extending vertically upwardly out of the table along the connecting join, and comprising a device for sealing the joins of the veneer strips by compression in which the thread guide and the pressure roller are arranged on a common carriage above the veneer strips, said carriage being displaceable parallel to the connecting join of the veneer strips, the separating bar being divided into individual separating elements which are arranged in a row at spaced intervals from each other and are lowerable in succession into the supporting table synchronously with the movement of the carriage.

For the synchronization of movements, the carriage is preferably displaceable from an upper conveyor chain along a horizontal cross bar and a switch shoe controlling the lowering movements of the supporting bar elements and is displaceable by a lower conveyor chain below the carriage under the supporting table, the upper conveying chain and the lower conveying chain being connected to a common drive producing their synchronous movement.

Each separating bar element is preferably connected to a displacing unit having a switch actuated by the switch shoe. The displacement unit is preferably formed as an electromagnet, the supporting bar element being secured to the upper end of an armature extending out of the magnet coil. The displacing unit is also preferably formed as a vertical double acting pressure-operated cylinder, whilst the separating bar element is secured to the upper end of a piston rod extending out of the pressure-operated cylinder. The pressure-operated cylinder is preferably operated by a hydraulic pressure medium or a pneumatic pressure medium.

It is preferable for the switch of the displacement unit to be formed as a valve for the pressure medium and provided below the pressure operated cylinder. The valve may be a 3/2 way ball pneumatic valve.

All the pressure operated cylinders are preferably directly connected in parallel on their lower side remote from the separating bar elements to a common pressure medium supply line.

It is preferable that, when each valve is actuated by the switch shoe, the upper end of the piston of the pressure operated cylinder, facing the separating bar element, should be loaded by the pressure medium, whilst the lower end of the piston is pressureless.

The device for conveying the veneer strips in opposite directions to the separating bar elements preferably comprises two groups of conveyor belts arranged in parallel on the supporting table and with clearances from each other, the direction of movement of said belts extending in a horizontal plane perpendicular to the row of separating bar elements. The conveyer belts of one group are preferably displaceable towards the separating bar elements, whilst the conveyer belts of the other group are displaceable towards the separating bar elements and away from them.

The device for the compression of the veneer strips so that the joins are tightly sealed, preferably contains two parallel horizontal friction shafts of the same diameter which are arranged between the two groups of conveyor belts near the separating bar elements, whilst the upper generatrices thereof lie in the plane of the supporting table and the separating bar elements may be pushed through the space between the friction shafts. The friction shafts are preferably driven oppositely to each other, the movement of their upper ends being directed towards the separating bar elements. Rings of an elastic material, such as Vulkollan, are preferably disposed on the friction shafts.

It is preferable for the friction shafts to be supported by a plurality of horizontal balance beams provided at spaces from each other, said beams extending perpendicularly to the axes of the friction shafts. Each balance beam is preferably secured to two supporting beams extending on both sides of the supporting beam elements over the entire length of the row, said beams being firmly connected together. Each balance beam is preferably supported to swing on the upper end of a vertical pin which is inserted into a bore common to both supporting beams. At the same time, the pin is preferably adjustable in height by means of a screw screwed into the supporting beams on the underside along the bore.

The present invention will be further illustrated, by way of example, with reference to the accompanying drawings, in which:

FIG. 3 shows a section taken on the line I—I of FIG. 2;

FIG. 4 shows a section taken on the line II—II of FIG. 2;

FIG. 5 shows the arrangement of a balance beam, a friction shaft and a piston rod with a separating bar element on a supporting beam, shown in perspective.

Figure 1:
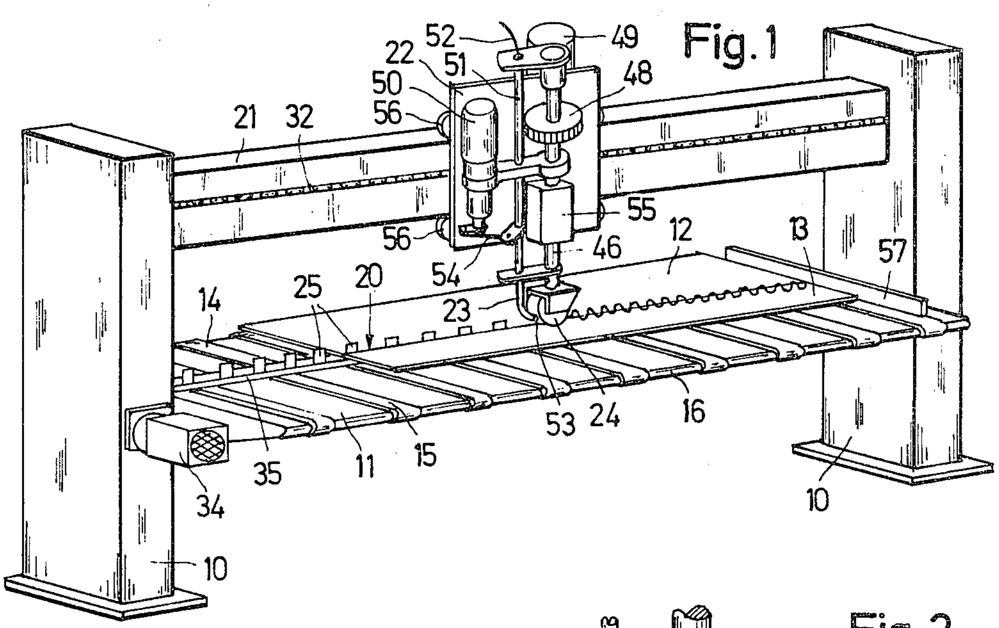
FIG. 1 shows a perspective view of the machine of the present invention for the assembling of veneer strips.
Figure 2:
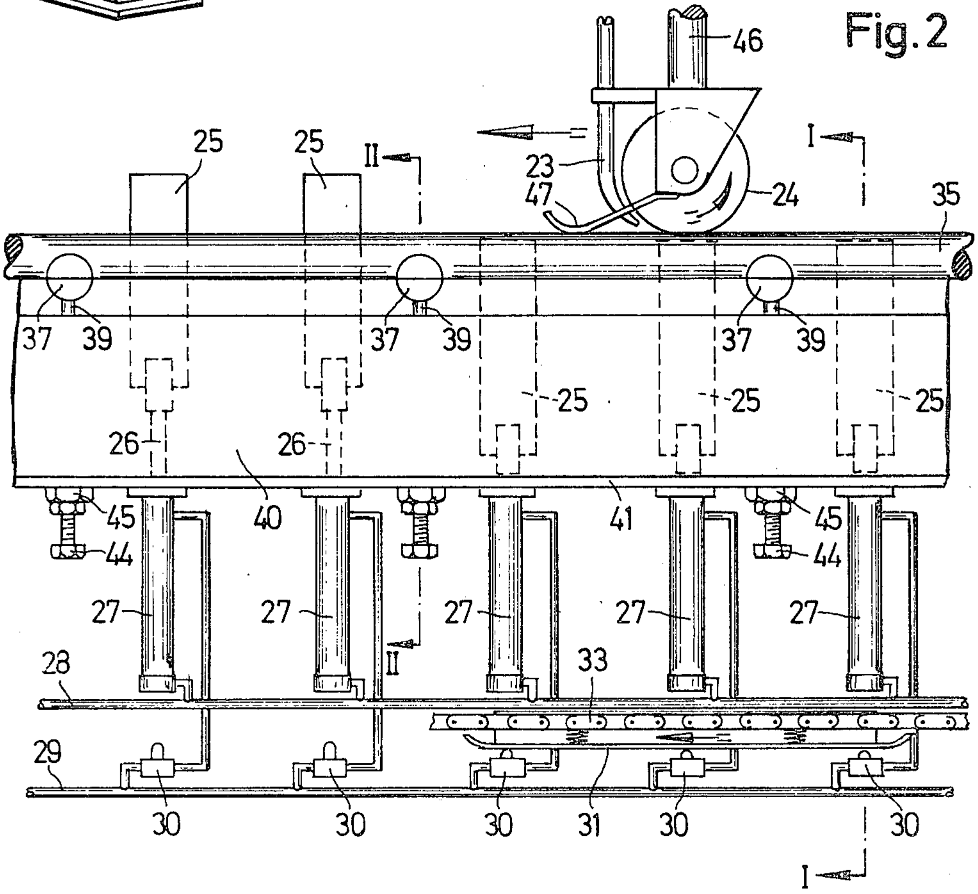
FIG. 2 shows a schematic view of the assembling of the individual devices of the machine, similarly to a section through the machine in the direction of movement of the veneer strips.

The machine for assembling veneers comprises two vertical supporting stands 10 which are arranged with a clearance from each other that is greater than the maximum length of the veneers in the fibre direction. Approximately half way up, a supporting table 11 is secured to the stands 10. A front veneer strip 12, viewed in the working direction, and a rear veneer strip 13 are disposed on the table 11 and are to be connected together at their edges. The supporting table 11 is equipped with two groups of front conveyer belts 14 and rear conveyer belts 15. The conveyer belts 14 and 15 of one group are each arranged with clearances from each other. They are connected together in the manner of an endless conveyer belt and are forced into their direction of movement by reversing rollers 16 and 17, guide rollers 18 and driving rollers 19. The front conveyer belts 14 can move in both directions. They are therefore able to move above the table 11 towards the connecting join 20 of both veneer strips 12 and 13, and away from the connecting join. The conveyer belts 15 of the other group can move above the table 11 only towards the connecting join 20.

Mounted above the supporting table 11, on the stands 10, is a cross-bar 21 serving as a guide for a carriage 22. A thread guide 23 and a pressure roller 24 are mounted on the guide and can execute, jointly with the carriage 22 as it rolls on the cross-bar 21, a straight movement between the two supporting stands 10. Both are arranged to point downwardly so that the thread guide 23 can be reciprocated directly above the connecting join 20 of the veneer strips to be connected together 12, and 13, and the pressure roller 24 can roll along the connecting join 20 whilst executing pressure on the veneer strips 12 and 13.

So that the connecting join 20 of both veneer strips 12 and 13 has a clear position on the machine, flat separating bar elements 25 are provided with a space from each other along a straight row corresponding to the desired position of the connecting join 20. These elements are disposed between the two groups of conveyer belts 14 and 15 and serve as stops for the veneer strips 12 and 13.

Since the veneer strips 12 and 13 retain an unchanged position on the machine during the connecting process, whilst the adhesive thread is guided by the thread guide in the region of the connecting join 20 in a meandering form to the veneer strips 12 and 13 and is pressed by the pressure roller 24 along the connecting join 20, it is necessary for the separating element 25 to move out of the connecting join 20 to the same extent as the thread guide 23 and the pressure roller 24 move over the connecting join 20. For this purpose, each element 25 is connected on its underside to the piston of a pressure operated cylinder 27 by way of a piston rod 26, said cylinder being arranged vertically below the element 25. The separating bar elements 25 therefore extend, in the upper end position of their piston rods 26, out of the table 11 perpendicularly and form there the stops for the veneer strips 12 and 13, whilst they completely open up the space above the table 11 in the lower end position of their piston rods 26. Each pressure operated cylinder 27 is connected at its lower end to a supply line 28 of pressure medium and at its upper end to another supply line 29 of the pressure medium. In these connections, the pressure operated cylinders 27 are each operated in parallel. The lower connections are effected directly with the supply line 28, whilst valves 30 are inserted between the upper connections and the pressure medium supply line 29. The pistons slide in the pressure medium cylinders 27 with friction so that the rods 25, and with them, the separating elements 25 do not automatically change their position when the cylinder is pressureless.

For actuating the valves 30, a switch shoe 31 is provided which is disposed always below the slide 22 with the thread guide 23 and the pressure roller 24. In the place of the switch shoe 31, the valves 30 are actuated by switch shoe 31 so that the connection from the supply line 29 to the upper connections of the pressure medium cylinders 27 is open. In this case pressure medium can therefore act on the ends of the pistons adjacent to the separating elements 25, with the result that the elements 25 are lowered. The movements of the carriage 22 and the switch shoe 31 are coupled by way of an upper conveyer chain 32 and a lower conveyer chain 33. Both are driven by the shaft of a common drive 34. At the same time, the upper conveyer chain 32 effects the movement of the slide 22 along the cross-bar 21, whilst the lower conveyer chain 33 is connected to the switch shoe 31 and moves it on. The result of this arrangement is that the separating elements 25 are lowered, due to the actuation of the valves 30, by the switch shoe 31, always on the connecting join 20 of the veneer strips 12 and 13 where the pressure roller 24 is disposed. The elements 25 are therefore unable to hinder the operation of the pressure roller 24.

The device for the compression of veneer strips 12 and 13 so that the joins are sealed tight, comprises two friction shafts 35 which are arranged on the machine parallel to the row of separating elements 25. The axes of the friction shafts 35 lie in a horizontal plane approximately below the surface of the supporting table 11, whilst the top generatrices of the two friction shafts 35 with the same diameter drop approximately in the plane of the table. Thin rings 36 of elastic material may also be disposed on the friction shafts 35 in order to increase the friction between the shafts and the undersides of the veneer strips 12 and 13. When the machine is switched on, the friction shafts 35 rotate in opposite directions, whilst each is disposed by a portion of its upper circumference by means of the pressure produced by the rolling pressure roller 24 in contact with the particular veneer strip and the veneer strips approach the separating element 25 at first and then holds them in the contact position. In this manner, a tight connecting join 20 is produced and maintained between the two veneer strips 12 and 13.

The friction shafts 35 are mounted on their lower side in balance beams 37, the main direction of extension of which extends perpendicularly to the axes of the friction shaft 35 and which extend along the row of separating elements 25 with clearances from each other. The arrangement thereof on the machine may for example be such that a balance beam follows each two separating elements 25. At the same time, the balance beams 37 are disposed in the space between two successive elements 25.

Each balance beam 37 is supported by a pin 38. The pins 38 are arranged perpendicularly in the plane of the separating elements 25 according to the spaces between the balance beams 37. This supporting arrangement makes it possible to swing the balance beam 37 slightly in all directions. So that the balance beams 37 cannot rotate, they are secured, in addition by means of screws 39, which, however, do not hinder the slight possibility of swinging the balance beams 37. The pins 38 and the screws 39 are in two supporting beams 40 firmly connected together and rigidly mounted on the machine. The connection of the supporting beams is established by means of screw receiving members 41 and screws 42 on the underside, it is also possible to apply additional screws to the upper side of the support beams.

For the pins 38, a plurality of central vertical through bores 43 are made in the support beams. The pins 38 can be inserted from below into the bores 43. Subsequently, screws 44 for the vertical adjustment of the pins 38 can be screwed into a threaded part 45 screwed into the screwed receiving part and plugged therewith. The screw 44 acts on the pin 38 in the bore 43 within both the assembled support beams 40. Each pin 38 can be adjusted individually in its height in this manner. Before the machine begins to work, the pins 38 are aligned by means of screws 44.

The arrangement of the friction shafts 35 and the supporting thereof renders possible uniform and very accurate adjustment of the tight connecting join 20 between the two veneer strips 12 and 13. Due to their swinging mounting position, and in view of their different thicknesses and slight unevennesses on the surfaces of the veneer strips 12 and 13, compensation is effected at the point of contact of their edges so that the pressure roller 24 always exerts uniform pressure on the veneer strips in the region of the connecting join 20. Veneer connections of high quality can therefore be obtained by the device of the present invention for the assembling of veneer strips with a tightly sealed join.

So that the machine can work and effect a connection both during the outward movement of the carriage 22 on the cross bar 21 and during the return movement, the pressure roller 24 can turn, together with the thread guide 23, disposed in front of it in the working direction, about a vertical shaft 46 through 180°. In such a rotation the thread guide 23 and a holding-down device 47 for the veneer strips 12 and 13 become disposed again in the new operating direction in front of the pressure roller 24. The vertical shaft 46 at the lower end of which the pressure roller 24 is disposed, is provided for this purpose with a toothed wheel 48 that can be driven by a driving motor 49. By means of levers the driving motor 50 and the feed tube 51 are swung through 180° jointly by the vertical shaft 46 with the heating device for the adhesive thread 52. The reciprocating movement of the opening 53 of the feed tube 51 is produced by the driving motor 50 by way of a crank drive 54 which sets the feed tube 51 in alternating rotary movements about its longitudinal axis. The driving motor 49 may be formed as a pneumatic rotary cylinder. In order to raise the pressure roller 24, its vertical shaft 46 is interrupted, the ends of the shaft communicating with a pneumatic lifting cylinder 55. The carriage 22 is provided with rollers 56 rolling on the cross bar 21 when the carriage 22 moves along the cross bar 21.

The machine of the present invention operates as follows: the first veneer strip 12 is placed by hand on the supporting table 11, care being taken to ensure that it is in contact by one end with the stop ledge 57. The elements 25 of the separating bar are all lowered. Due to the movement of the conveyor belts 15 and 14 in the same working direction, the veneer strip is moved beyond the line of the elements 25. After the next veneer strip 13 has been placed on the table 11 in the same manner, the direction of movement of the conveyor belts 14 is reversed, so that now both veneer strips 12 and 13 move towards the line of the separating elements 25. Meanwhile the pressure medium supply line 28 is loaded with pressure medium, so that all the elements 25 are moved out upwardly. They now form the stops for the exact position of the veneer strips 12 and 13. The friction shafts 35 are also in action and the carriage 22 begins the work of connection on one side of the machine.

The adhesive thread 52 runs through the feed tube 51, is heated at its lower end by the heating device provided there so that the adhesive is activated and is placed in a meandering form on the connecting join 20 as a result of the work of the crank or eccentric drive 54, said join being tightly held by the friction shafts 35 together with the pressure roller 24.

Due to the synchronisation of the movement of the carriage 22 and the switch shoe 31 by means of the conveyor chains 32 and 33, and with the continuing movement of the pressure roller 24 by the switch shoe 31, the valve 30 is opened on the pressure medium cylinder 27 towards whose separating bar element 25 the pressure roller 24 is moving. The opening of the valve 30 effects a temporary (brief) connection of the upper cylinder chamber with the supply line 29 now conveying pressure medium. Since the supply line 28 is pressureless during this operation, the pressure medium from the supply line 29 drives downwardly the piston which is still in the upper position as a result of its friction against the cylinder wall. With the piston, the element 25, connected therewith by way of the piston rod 26, is lowered so that further travel for the pressure roller 24 is free.

After both veneer strips are connected together over their entire length and the carriage 22 has reached a stand 10 of the machine, the direction of movement of the conveyor belt 14 is reversed by actuation of end switches, so that both the connected veneer strips 12 and 13 are removed from the region of the elements 25. The pressure medium supply line 28 is briefly connected to the pressure medium, so that all the separating elements 25 are returned to their upper end position and, after the supply line 28 is switched off, remain in their position as a result of the friction and serve as stops for the edges of the veneer where the next connection is to be effected. A new strip is placed in position. The direction of movement of the conveyor belts 14 is reversed and, after the pressure roller 24 and the feed tube 51 are switched through 180° on the carriage 22, said carriage can begin a new connecting operation with the return movement.

Instead of the reciprocating thread guide 23 which carries the adhesive thread 52 onto the veneer strips, a device may be provided which is moved only in a straight line along the connecting join 20 and sticks a (wider) paper strip there onto the veneer strips.

In addition to the pressure roller 24, other rollers may be provided which assist the assembling of the veneer strips at the connecting join.

I claim:

1. Machine for assembling veneer strips, said machine comprising a supporting table, a thread guide reciprocating in a horizontal plane provided above said supporting table, a pressure roller, a paper strip pasting device or veneer strip pasting device arranged in front of said pressure roller, said pressure roller rolling on said veneer strips along the connecting join thereof, and including a device for conveying said veneer strips in opposite directions to a separating bar serving as a stop so that leading edges of a succeeding strip abut trailing edges of a preceding strip, said separating bar extending vertically upwardly out of said supporting table along said connecting join, and further including a device for sealing the joins of said veneer strips by compression, the device including a common carriage on which said thread guide and said pressure roller are arranged above said veneer strips, a horizontal cross bar, and an upper conveyor chain, said carriage being displaceable parallel to the connecting join of said veneer strips, said separating bar being divided into individual separating elements which are arranged in a row at spaced intervals from each other and are lowerable in succession into said supporting table synchronously with the movement of said carriage, said carriage being displaceable by the upper conveyor chain along the horizontal cross bar, a switch shoe controlling the downward movements of said separating elements, a lower conveyor chain positioned under said carriage below said table for displacing said switch shoe, and a common drive connected to said upper conveyor chain and said lower conveyor chain for producing synchronous movement of said upper and said lower chains.

2. Machine for assembling veneer strip according to claim 1, wherein each separating bar element is connected to a displacement unit having a switch actuated by the switch shoe, wherein said displacement unit is formed as a vertical double-acting pressure medium cylinder, said separating element being secured to an upper end of a piston rod extending out of said pressure medium cylinder, wherein said switch of the displacement unit is formed as a valve for controlling pressure medium operating said pressure medium cylinder, said valve being arranged below said pressure medium cylinder, and wherein, when each valve is actuated by the switch shoe, the upper end of the piston of said pressure medium cylinder facing said element, is loaded by pressure medium, whilst the lower end of said piston is pressureless.

3. Machine for assembling veneer strips, said machine comprising a supporting table, a thread guide reciprocating in a horizontal plane provided above said supporting table, a pressure roller, a paper strip pasting device or veneer strip pasting device arranged in front of said pressure roller, said pressure roller rolling on said veneer strips along the connecting join thereof, and including a device for conveying said veneer strips in opposite directions to a separating bar serving as a stop so that leading edges of a succeeding strip abut trailing edges of a preceding strip, said separating bar extending vertically upwardly out of said supporting table along said connecting join, and further including a device for sealing the joins of said veneer strips by compression in which said thread guide and said pressure roller are arranged on a common carriage above said veneer strips, said carriage being displaceable parallel to the connecting join of said veneer strips, said separating bar being divided into individual separating elements which are arranged in a row at spaced intervals from each other and are lowerable in succession into said supporting table synchronously with the movement of said carriage, and a displacement unit having a switch and a switch shoe for actuating the switch, each separating bar element being connected to the displacement unit.

4. A machine as recited in claim 3, wherein said displacement unit is formed as a vertical double-acting pressure medium cylinder, said separating element being secured to an upper end of a piston rod extending out of said pressure medium cylinder.

5. A machine as recited in claim 4, wherein said pressure medium cylinder is loaded with hydraulic pressure medium.

6. A machine as recited in claim 4, wherein said pressure medium cylinder is loaded with a pneumatic pressure medium.

7. A machine as recited in claim 4, wherein said switch of the displacement unit is formed as a valve for controlling pressure medium operating said pressure medium cylinder, said valve being arranged below said pressure medium cylinder.

8. A machine as recited in claim 7, wherein said valve is a 3/2 way ball pneumatic valve.

9. A machine as recited in claim 4, wherein the pressure medium cylinders of the displacement units are connected directly in parallel on their lower sides remote from said separating elements to a common pressure medium supply line.

10. A machine as recited in claim 9, wherein all said pressure medium cylinders are connected in parallel on their upper sides facing said separating elements to another common pressure medium supply line and wherein valves are interposed between said pressure medium cylinders and said another common pressure medium supply line.

11. A machine for assembling veneer strips, said machine comprising a supporting table, a thread guide reciprocating in a horizontal plane provided above said supporting table, a pressure roller, a paper strip pasting device or veneer strip pasting device arranged in front of said pressure roller, said pressure roller rolling on said veneer strips along the connecting join thereof, and including a device for conveying said veneer strips in opposite directions to a separating bar serving as a stop so that leading edges of a succeeding strip abut trailing edges of a preceding strip, said separating bar extending vertically upwardly out of said supporting table along said connecting join, and further including a device for sealing the joins of said veneer strips by compression in which said thread guide and said pressure roller are arranged on a common carriage above said veneer strips, said carriage being displaceable parallel to the connecting join of said veneer strips, said separating bar being divided into individual separating elements which are arranged in a row at spaced intervals from each other and are lowerable in succession into said supporting table synchronously with the movement of said carriage, said device for conveying said veneer strips to the separating elements in opposite directions, comprising two groups of conveyer belts, the belts of each group being arranged in parallel on said table and at spaced intervals from each other, the direction of movement of said belts extending in a horizontal plane perpendicularly to the row of separating elements, said conveyor belts of one group being movable towards said separating elements, whilst the conveyor belts of the other groups are selectively movable towards said separating elements and away from them.

12. A machine for assembling veneer strips, said machine comprising a supporting table, a thread guide reciprocating in a horizontal plane provided above said supporting table, a pressure roller, a paper strip pasting device or veneer strip pasting device arranged in front of said pressure roller, said pressure roller rolling on said veneer strips along the connecting join thereof, and including a device for conveying said veneer strips in opposite directions to a separating bar serving as a stop so that leading edges of a succeeding strip abut trailing edges of a preceding strip, said separating bar extending vertically upwardly out of said suppporting table along said connecting join, and further including a device for sealing the joins of said veneer strips by compression in which said thread guide and said pressure roller are arranged on a common carriage above said veneer strips, said carriage being displaceable parallel to the connecting join of said veneer strips, said separating bar being divided into individual separating elements which are arranged in a row at spaced intervals from each other and are lowerable in succession into said supporting table synchronously with the movement of said carriage, said device for conveying said veneer strips to the separating elements in opposite directions, comprising two groups of conveyer belts, the belts of each group being arranged in parallel on said table and at spaced intervals from each other, the direction of movement of said belts extending in a horizontal plane perpendicularly to the row of separating elements, said device for sealing the joins of said veneer strips by compression containing two parallel horizontal friction shafts of the same diameter arranged between the two groups of conveyer belts in the region of said separating elements, the upper generatrices of which lie approximately on the plane of said table, and said separating elements being pushed through the space between said friction shafts.

13. A machine as recited in claim 12, wherein said friction shafts are driven in opposite directions, the movements of the upper sides thereof being directed at said separating elements.

14. A machine as recited in claim 13, wherein rings of an elastic material are placed on said friction shafts.

15. A machine as recited in claim 12, wherein said friction shafts are supported by a plurality of horizontal balance beams which are arranged at spaced intervals from each other and extend perpendicular to the axes of said friction shafts.

16. A machine as recited in claim 15, wherein each balance beam is secured to two supporting beams which extend on both sides of said separating elements over the entire length of the row of separating elements, said supporting beams being firmly connected together.

17. A machine as recited in claim 16, wherein each balance beam is supported to swing on the upper end of a vertical pin which is inserted in a bore common to both supporting beams.

18. A machine as recited in claim 17, wherein said pin is adjustable in its height by a screw screwed into said supporting beams on the underside along said bore.

19. A machine as recited in claim 18, wherein said supporting beams are formed with a dove-tailed cross-section on their upper sides and have horizontal support surfaces, the radius of said dove-tail greater than the radius of said friction shafts.

20. A machine as recited in claim 19, wherein said upper generatrices of said friction shafts lie in the plane of the support surfaces.

* * * * *